(12) United States Patent
Li et al.

(10) Patent No.: US 9,822,196 B2
(45) Date of Patent: *Nov. 21, 2017

(54) CATALYST COMPOSITION FOR OLEFIN POLYMERIZATION AND APPLICATION OF SAME

(71) Applicants: China Petroleum & Chemical Corporation, Beijing (CN); Beijing Research Institute of Chemical Industry, China Petroleum & Chemical Corporation, Beijing (CN)

(72) Inventors: Changxiu Li, Beijing (CN); Mingzhi Gao, Beijing (CN); Haitao Liu, Beijing (CN); Jing Ma, Beijing (CN); Jianhua Chen, Beijing (CN); Xianzhong Li, Beijing (CN); Xiaoxia Cai, Beijing (CN); Jixing Ma, Beijing (CN); Jun Wang, Beijing (CN); Jianjun Hu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/025,698

(22) PCT Filed: Sep. 28, 2014

(86) PCT No.: PCT/CN2014/087709
§ 371 (c)(1),
(2) Date: Mar. 29, 2016

(87) PCT Pub. No.: WO2015/043526
PCT Pub. Date: Apr. 2, 2015

(65) Prior Publication Data
US 2016/0244538 A1    Aug. 25, 2016

(30) Foreign Application Priority Data

| Sep. 30, 2013 | (CN) | 2013 1 0459838 |
| Sep. 30, 2013 | (CN) | 2013 1 0461226 |
| Sep. 30, 2013 | (CN) | 2013 1 0461704 |
| Sep. 30, 2013 | (CN) | 2013 1 0461718 |
| Sep. 30, 2013 | (CN) | 2013 1 0461740 |
| Sep. 30, 2013 | (CN) | 2013 1 0462810 |

(51) Int. Cl.
*C08F 110/06* (2006.01)

(52) U.S. Cl.
CPC ................... *C08F 110/06* (2013.01)

(58) Field of Classification Search
None
See application file for complete search history.

(56) References Cited

U.S. PATENT DOCUMENTS

| 4,540,679 A | 9/1985 | Arzoumanidis |
| 2009/0203863 A1* | 8/2009 | Chen .............. B01J 8/1809 526/194 |
| 2009/0253874 A1* | 10/2009 | Hosaka .............. C08F 10/00 526/125.3 |
| 2012/0157296 A1 | 6/2012 | Chen et al. |

FOREIGN PATENT DOCUMENTS

| CN | 85100997 A | 1/1987 |
| CN | 1091748 A | 9/1994 |
| CN | 1292800 A | 4/2001 |
| CN | 1298888 A | 6/2001 |
| CN | 1506384 A | 6/2004 |
| WO | 2012052387 A1 | 4/2012 |
| WO | 2013004781 A1 | 1/2013 |
| WO | 2013027560 A1 | 2/2013 |

OTHER PUBLICATIONS

International Search Report for International Application No. PCT/CN2014/087709, dated Jan. 4, 2015.
Written Opinion of the International Search Authority for International Application No. PCT/CN2014/087709, dated Jan. 4, 2015.
International Preliminary Report of Patentability for International Application No. PCT/CN2014/087709, dated Apr. 5, 2016.

* cited by examiner

*Primary Examiner* — Catherine S Branch
(74) *Attorney, Agent, or Firm* — Duane Morris LLP

(57) ABSTRACT

The present disclosure discloses a catalyst composition for olefin polymerization, comprising the following components: a): a solid catalyst component containing magnesium, titanium, halogens, and at least one internal electron donor having a lone pair of electrons; b): an aluminum alkyl compound; and c): an external electron donor containing a first external electron donor C1, which is a malonate compound. In the present disclosure, a catalyst composition having an external electron donor that contains a malonate compound is used in olefin polymerization, in particular propene polymerization, and can significantly improve catalytic activity and hydrogen response of the catalyst and expand molecular weight distribution of polymers, which facilitates development of different polymers.

19 Claims, No Drawings

CATALYST COMPOSITION FOR OLEFIN POLYMERIZATION AND APPLICATION OF SAME

FIELD OF THE INVENTION

The present disclosure belongs to the field of olefin polymerization, and specifically relates to a catalyst composition with a malonate compound as an external electron donor. The present disclosure further relates to use of the above catalyst composition.

BACKGROUND OF THE INVENTION

As is well-known, Ziegler-Natta catalysts can be used in olefin polymerization, and enable formation of highly stereospecific polymers at a high yield especially when being used in the polymerization of α-olefins having three or more carbon atoms. Solid titanium catalyst components in the Ziegler-Natta catalysts have magnesium, titanium, halogens, and internal electron donors as basic components. The development of internal electron donors, as an essential ingredient in the catalyst component, has promoted constant upgrading of polymerization catalysts, and meanwhile accelerated development of external electron donors. Currently, a large variety of electron donors have been disclosed, such as monocarboxylates or polycarboxylates, ketones, monoethers or polyethers, amines, and derivatives thereof as internal electron donors, and monocarboxylates, amines, aminosilane, and derivatives thereof as external electron donors.

In recent years, people are trying to develop new external electron donors to be used in olefin polymerization, so as to obtain catalysts of higher performance, and thus to develop polymers of difference performance.

WO2012052387 discloses a dicarboxylate compound comprising more than 4 carbon atoms, such as adipate and pimelate. Employment of a diol ester as the internal electron donor and a dicarboxylate as the external electron donor can significantly improve hydrogen response of the catalyst. Preparation of the dicarboxylate, however, is complex and of high costs due to long carbon chains therein.

The present disclosure aims to provide a catalyst composition of higher activity, stereospecificity, and hydrogen response, and polymers of wider molecular weight distribution can be obtained.

SUMMARY OF THE INVENTION

To solve the problems in the prior art, the present disclosure provides a catalyst composition, using an external electron donor containing a malonate compound. When the catalyst composition is used in olefin polymerization, in particular in propene polymerization, it shows both higher activity and higher hydrogen response, and produces polymers of wider molecular distribution than existing catalysts.

According to one aspect of the present disclosure, it aims to provide a catalyst composition for olefin polymerization.

According to another aspect of the present disclosure, it aims to provide a pre-polymerization catalyst system for olefin polymerization.

According to still another aspect of the present disclosure, it aims to provide use of the above catalyst composition and pre-polymerization catalyst system.

According to the first aspect of the present disclosure, it provides a catalyst composition for olefin polymerization, comprising the following components:

a): a solid catalyst component containing magnesium, titanium, halogens, and at least one internal electron donor having a lone pair of electrons;

b): an aluminum alkyl compound; and c): an external electron donor containing a first external electron donor C1, which is a malonate compound.

According to one specific embodiment of the present disclosure, the internal electron donor in solid catalyst component a) is selected from the group of compounds containing the atom of O, N, P, or S, preferably the group of compounds containing the atom of O.

According to one preferred embodiment of the present disclosure, the internal electron donor in solid catalyst component a) is selected from the group consisting of ether, ester, phenolic ether, phenolic ester, and ketone compounds, preferably from diol ester compounds, succinate compounds, phthalate compounds, and diether compounds.

In one specific embodiment of the catalyst composition of the present disclosure, the diol ester compounds have a general formula as shown in Formula (II):

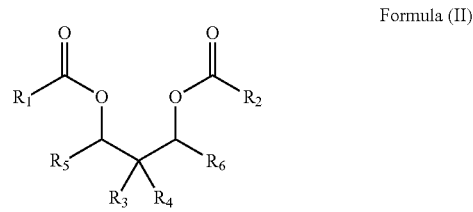

Formula (II)

wherein, $R_1$ and $R_2$, identical with or different from each other, are selected from the group consisting of substituted or non-substituted $C_1$ to $C_{20}$ alkyl groups, $C_3$ to $C_{20}$ cycloalkyl groups, $C_6$ to $C_{20}$ aryl groups, $C_7$ to $C_{20}$ alkaryl groups, and $C_7$ to $C_{20}$ aralkyl groups, preferably from the group consisting of $C_1$ to $C_5$ alkyl, phenyl, and halogenated phenyl groups, $C_1$ to $C_5$ alkyl phenyl groups, and halogenated $C_1$ to $C_5$ alkyl phenyl, indenyl, benzyl, and phenyl ethyl groups;

wherein, $R_3$ and $R_4$, identical with or different from each other, are selected from the group consisting of hydrogen, halogens, and substituted or non-substituted $C_1$ to $C_{10}$ straight-chain alkyl groups, $C_3$ to $C_{10}$ branched-chain alkyl groups, $C_3$ to $C_{10}$ cycloalkyl groups, $C_6$ to $C_{10}$ aryl groups, and $C_7$ to $C_{10}$ alkaryl or aralkyl groups, preferably from the group consisting of hydrogen, methyl, ethyl, n-propyl, iso-propyl, n-butyl, iso-butyl, chlorine, and bromine, R3 and R4 optionally being bounded to or not to form a ring; and wherein, $R_5$ and $R_6$, identical with or different from each other, are selected from the group consisting of halogens, and substituted or non-substituted $C_1$ to $C_{10}$ straight-chain alkyl groups, $C_3$ to $C_{10}$ branched-chain alkyl groups, $C_3$ to $C_{10}$ cycloalkyl groups, $C_6$ to $C_{10}$ aryl groups, and $C_7$ to $C_{10}$ alkaryl or aralkyl groups, preferably from the group consisting of methyl, ethyl, n-propyl, iso-propyl, n-butyl, iso-butyl, and halogenated methyl, ethyl, n-propyl, iso-propyl, n-butyl, and iso-butyl.

In the present disclosure, the term "substituted" means that hydrogen atoms in the respective groups can be optionally substituted by alkyl groups or halogen atoms. For example, the substituted alky, cycloalkyl, aryl, alkaryl, or aralkyl group means that hydrogen atoms attached to the carbon atom of the alkyl, cycloalkyl, aryl, alkaryl, or aralkyl group can be optionally substituted by alkyl groups or halogen atoms. In one specific embodiment, $R_1$ and $R_2$ may not be $C_3$ to $C_{20}$ cycloalkyl groups at the same time.

In the catalyst composition of the present disclosure, specific examples of the diol ester compounds can be but not limited to at least one selected from the group consisting of 2,4-pentanediol dibenzoate, 2,4-pentanediol di-p-methyl-benzoate, 2,4-pentanediol di-m-methyl-benzoate, 2,4-pentanediol di-o-methyl-benzoate, 2,4-pentanediol di-p-ethyl-benzoate, 2,4-pentanediol di-p-n-propyl-benzoate, 2,4-pentanediol di-p-iso-propyl-benzoate, 2,4-pentanediol di-p-iso-butyl-benzoate, 2,4-pentanediol di-p-n-butyl-benzoate, 2,4-pentanediol di-p-tert-butyl-benzoate, 3-methyl-2,4-pentanediol dibenzoate, 3-ethyl-2,4-pentanediol dibenzoate, 3-n-propyl-2,4-pentanediol dibenzoate, 3-ethyl-2,4-pentanediol di-p-methyl-benzoate, 3-ethyl-2,4-pentanediol di-p-ethyl-benzoate, 3-ethyl-2,4-pentanediol di-p-n-propyl-benzoate, 3-ethyl-2,4-pentanediol di-p-iso-propyl-benzoate, 3-ethyl-2,4-pentanediol di-p-iso-butyl-benzoate, 3-ethyl-2,4-pentanediol di-p-n-butyl-benzoate, 3-ethyl-2,4-pentanediol di-p-tert-butyl-benzoate, 3-n-butyl-2,4-pentanediol dibenzoate, 3,3-di-methyl-2,4-pentanediol dibenzoate, 3-chloro-2,4-pentanediol dibenzoate, 3-bromo-2,4-pentanediol dibenzoate, 3,5-heptanediol dibenzoate, 3,5-heptanediol di-p-methyl-benzoate, 3,5-heptanediol di-p-ethyl-benzoate, 3,5-heptanediol di-p-n-propyl-benzoate, 3,5-heptanediol di-p-iso-propyl-benzoate, 3,5-heptanediol di-p-iso-butyl-benzoate, 3,5-heptanediol di-p-n-butyl-benzoate, 3,5-heptanediol di-p-tert-butyl-benzoate, 4-methyl-3,5-heptanediol dibenzoate, 4,4-dimethyl-3,5-heptanediol dibenzoate, 4-ethyl-3,5-heptanediol dibenzoate, 4-ethyl-3,5-heptanediol di-p-methyl-benzoate, 4-ethyl-3,5-heptanediol di-p-ethyl-benzoate, 4-ethyl-3,5-heptanediol di-p-propyl-benzoate, 4-ethyl-3,5-heptanediol di-p-butyl-benzoate, 4-ethyl-3,5-heptanediol di-p-tert-butyl-benzoate, 4-n-propyl-3,5-heptanediol dibenzoate, 4-n-butyl-3,5-heptanediol dibenzoate, 4-chloro-3,5-heptanediol dibenzoate, and 4-bromo-3,5-heptanediol dibenzoate.

According to another specific embodiment of the catalyst composition of the present disclosure, the phthalate compounds have a general formula as shown in Formula (III):

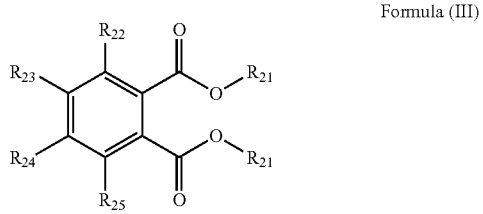

Formula (III)

wherein $R_{21}$ is selected from the group consisting of $C_1$ to $C_{10}$ straight-chain alkyl groups, $C_3$ to $C_{15}$ branched-chain alkyl groups, $C_3$ to $C_{15}$ cycloalkyl groups, $C_6$ to $C_{20}$ aryl groups, $C_7$ to $C_{20}$ alkaryl groups, and $C_7$ to $C_{20}$ aralkyl groups, preferably from the group consisting of $C_2$ to $C_8$ straight-chain alkyl groups, $C_3$ to $C_{10}$ branched-chain alkyl groups, $C_5$ to $C_{10}$ cycloalkyl groups, $C_6$ to $C_{15}$ aryl groups, $C_7$ to $C_{15}$ alkaryl groups, and $C_7$ to $C_{15}$ aralkyl groups, and more preferably from the group consisting of $C_1$ to $C_8$ straight-chain alkyl groups, $C_3$ to $C_{10}$ branched-chain alkyl groups, $C_6$ to $C_{10}$ aryl groups, $C_7$ to $C_{10}$ alkaryl groups, and $C_7$ to $C_{10}$ aralkyl groups; and wherein $R_{22}$ to $R_{25}$, identical with or different from one another, are selected from the group consisting of hydrogen, halogens, substituted or non-substituted $C_1$ to $C_{10}$ straight-chain alkyl groups, $C_3$ to $C_{15}$ branched-chain alkyl groups, $C_3$ to $C_{15}$ cycloalkyl groups, $C_6$ to $C_{20}$ aryl groups, $C_7$ to $C_{20}$ alkaryl groups, and $C_7$ to $C_{20}$ aralkyl groups, preferably from the group consisting of hydrogen, halogens, and substituted or non-substituted $C_1$ to $C_6$ straight-chain alkyl groups, $C_3$ to $C_{10}$ branched-chain alkyl groups, $C_5$ to $C_{10}$ cycloalkyl groups, $C_6$ to $C_{20}$ aryl groups, $C_7$ to $C_{20}$ alkaryl groups, and $C_7$ to $C_{20}$ aralkyl groups, and more preferably from the group consisting of hydrogen, halogens, and substituted or non-substituted $C_1$ to $C_6$ straight-chain alkyl groups and $C_3$ to $C_8$ branched-chain alkyl groups.

In the catalyst composition of the present disclosure, specific examples of the phthalate compounds comprise but are not limited to at least one selected from the group consisting of dimethyl phthalate, diethyl phthalate, di-n-propyl phthalate, di-iso-propyl phthalate, di-n-butyl phthalate, di-iso-butyl phthalate, di-n-pentyl phthalate, di-iso-pentyl phthalate, di-n-hexyl phthalate, di-iso-hexyl phthalate, di-n-octyl phthalate, di-iso-octyl phthalate, dibenzyl phthalate, dimethyl tetramethylphthalate, diethyl tetramethylphthalate, di-n-propyl tetramethylphthalate, di-iso-propyl tetramethylphthalate, di-n-butyl tetramethylphthalate, di-iso-butyl tetramethylphthalate, di-n-pentyl tetramethylphthalate, di-iso-pentyl tetramethylphthalate, di-n-hexyl tetramethylphthalate, di-iso-hexyl tetramethylphthalate, di-n-octyl tetramethylphthalate, di-iso-octyl tetramethylphthalate, dibenzyl tetramethylphthalate, dimethyl tetrabromophthalate, diethyl tetrabromophthalate, di-n-propyl tetrabromophthalate, di-iso-propyl tetrabromophthalate, di-n-butyl tetrabromophthalate, di-iso-butyl tetrabromophthalate, di-n-pentyl tetrabromophthalate, di-iso-pentyl tetrabromophthalate, di-n-hexyl tetrabromophthalate, di-iso-hexyl tetrabromophthalate, di-n-octyl tetrabromophthalate, di-iso-octyl tetrabromophthalate, and dibenzyl tetrabromophthalate.

According to another specific embodiment of the catalyst composition of the present disclosure, the diether compounds have a general formula as shown in Formula (IV):

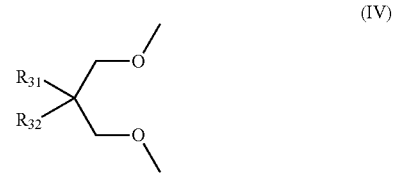

(IV)

wherein, $R_{31}$ and $R_{32}$, identical with or different from each another, are selected from the group consisting of substituted or non-substituted $C_1$ to $C_{10}$ straight-chain alkyl groups, $C_3$ to $C_{15}$ branched-chain alkyl groups, $C_3$ to $C_{15}$ cycloalkyl groups, $C_6$ to $C_{20}$ aryl groups, $C_7$ to $C_{20}$ alkaryl groups, and $C_7$ to $C_{20}$ aralkyl groups, preferably from the group consisting of substituted or non-substituted $C_1$ to $C_8$ straight-chain alkyl groups, $C_3$ to $C_{10}$ branched-chain alkyl groups, $C_3$ to $C_{10}$ cycloalkyl groups, $C_6$ to $C_{15}$ aryl groups, $C_7$ to $C_{15}$ alkaryl groups, and $C_7$ to $C_{15}$ aralkyl groups, $R_{31}$ and $R_{32}$ optionally being bounded to or not to form a ring.

In the catalyst composition of the present disclosure, the diether compounds can be but not limited to at least one selected from the group consisting of
2,2-dimethyl-1,3-dimethoxypropane,
2,2-diethyl-1,3-dimethoxypropane,
2,2-dipropyl-1,3-dimethoxypropane,
2,2-diisopropyl-1,3-dimethoxypropane, 2,2-dibutyl-1,3-dimethoxypropane,
2,2-diisobutyl-1,3-dimethoxypropane,
2,2-dipentyl-1,3-dimethoxypropane,
2,2-di-isopentyl-1,3-dimethoxypropane,
2-methyl-2-ethyl-1,3-dimethoxypropane,
2-methyl-2-propyl-1,3-dimethoxypropane,
2-methyl-2-isopropyl-1,3-dimethoxypropane,
2-methyl-2-butyl-1,3-dimethoxypropane,
2-methyl-2-isobutyl-1,3-dimethoxypropane,
2-methyl-2-pentyl-1,3-dimethoxypropane,
2-methyl-2-isopentyl-1,3-dimethoxypropane,
2-ethyl-2-propyl-1,3-dimethoxypropane,
2-ethyl-2-isopropyl-1,3-dimethoxypropane,
2-ethyl-2-butyl-1,3-dimethoxypropane,
2-ethyl-2-isobutyl-1,3-dimethoxypropane,
2-ethyl-2-pentyl-1,3-dimethoxypropane,
2-ethyl-2-isopentyl-1,3-dimethoxypropane,
2-propyl-2-isopropyl-1,3-dimethoxypropane,
2-propyl-2-butyl-1,3-dimethoxypropane,
2-propyl-2-isobutyl-1,3-dimethoxypropane,
2-propyl-2-pentyl-1,3-dimethoxypropane,
2-propyl-2-isopentyl-1,3-dimethoxypropane,
2-isopropyl-2-isobutyl-1,3-dimethoxypropane,
2-isopropyl-2-pentyl-1,3-dimethoxypropane,
2-isopropyl-2-isopentyl-1,3-dimethoxypropane,
2-butyl-2-isobutyl-1,3-dimethoxypropane,
2-butyl-2-pentyl-1,3-dimethoxypropane,
2-butyl-2-isopentyl-1,3-dimethoxypropane,
2-isobutyl-2-pentyl-1,3-dimethoxypropane,
2-isobutyl-2-isopentyl-1,3-dimethoxypropane,
2-isobutyl-2-phenyl-1,3-dimethoxypropane,
2-isopentyl-2-phenyl-1,3-dimethoxypropane,
2-(2-methylbutyl)-2-benzyl-1,3-dimethoxypropane,
2-(2-ethylbutyl)-2-phenyl-1,3-dimethoxypropane,
2-(2-ethylhexyl)-2-phenyl-1,3-dimethoxypropane,
2-methyl-2-phenyl-1,3-dimethoxypropane,
2-ethyl-2-phenyl-1,3-dimethoxypropane,
2-isobutyl-2-benzyl-1,3-dimethoxypropane,
2-isopentyl-2-benzyl-1,3-dimethoxypropane,
2-(2-methylbutyl)-2-benzyl-1,3-dimethoxypropane,
2-(2-ethylbutyl)-2-benzyl-1,3-dimethoxypropane,
2-(2-ethylhexyl)-2-benzyl-1,3-dimethoxypropane,
2-propyl-2-benzyl-1,3-dimethoxypropane,
2-isopropyl-2-benzyl-1,3-dimethoxypropane,
2-isobutyl-2-(2-ethylbutyl)-1,3-dimethoxypropane,
2-isopentyl-2-(2-ethylbutyl)-1,3-dimethoxypropane,
2-(2-methylbutyl)-2-(2-ethylbutyl)-1,3-dimethoxypropane,
2-(2-ethylhexyl)-2-(2-ethylbutyl)-1,3-dimethoxypropane,
2-methyl-2-(2-ethylbutyl)-1,3-dimethoxypropane,
2-ethyl-2-(2-ethylbutyl)-1,3-dimethoxypropane,
2-isobutyl-2-(2-methylbutyl)-1,3-dimethoxypropane,
2-isopentyl-2-(2-methylbutyl)-1,3-dimethoxypropane,
2-(2-ethylbutyl)-2-(2-methylbutyl)-1,3-dimethoxypropane,
2-(2-ethylhexyl)-2-(2-methylbutyl)-1,3-dimethoxypropane,
2-isobutyl-2-(2-methylbutyl)-1,3-dimethoxypropane,
2-isobutyl-2-(2-ethylhexyl)-1,3-dimethoxypropane,
2-isopentyl-2-(2-ethylhexyl)-1,3-dimethoxypropane,
2,2-bis(2-methylbutyl)-1,3-dimethoxypropane,
2-isopropyl-2-isopentyl-1,3-dimethoxypropane,
2,2-bis(2-ethylhexyl)-1,3-dimethoxypropane, and
9,9-bis(methoxymethyl)fluorene.

According to another specific embodiment of the catalyst composition of the present disclosure, the succinate compounds are commonly used ones in the art and can be, for example, at least one selected from the group consisting of 2,3-di-n-propyl diethyl succinate, 2,3-diisopropyl diethyl succinate, 2,3-di-n-butyl diethyl succinate, 2,3-diisobutyl diethyl succinate, 2,3-di-n-propyl diisobutyl succinate, 2,3-diisopropyl diisobutyl succinate, 2,3-di-n-butyl diisobutyl succinate, and 2,3-diisobutyl diisobutyl succinate.

According to the present disclosure, in solid catalyst component a), based on total weight thereof, the contents of the internal electron donor, titanium, and magnesium are in the range from 1 wt % to 25 wt % (for example 3 wt % to 25 wt %), 0.5 wt % to 8 wt %, and 3 wt % to 25 wt % (for example 8 wt % to 25 wt %), preferably in the range from 5 wt % to 20 wt %, 1 wt % to 6 wt %, and from 10 wt % to 20 wt %, and more preferably in the range from 8 wt % to 12 wt %, 2 wt % to 4 wt %, and 15 wt % to 20 wt %, respectively.

Solid catalyst component a) for olefin polymerization of the present disclosure preferably comprises reaction products of a titanium compound, a magnesium compound, and the above internal electron donor. The dosages of the titanium compound, the magnesium compound, and the internal electron donor for preparation of the solid catalyst component are not specifically defined and can be conventional amounts in the art.

The magnesium compound can be selected from the group consisting of magnesium dihalides, alkoxy magnesium, alkyl magnesium, hydrates or alcoholates of magnesium dihalides, and derivatives of magnesium dihalides with one halogen atom therein substituted by one hydrocarbyloxyl group or halogenated hydrocarbyloxyl group, preferably alcoholates of magnesium dihalides or magnesium dihalides. Specific examples thereof include magnesium dichloride, magnesium dibromide, magnesium diiodide, and alcoholates thereof.

The titanium compounds used have a general formula of $TiX_m(OR^1)_{4-m}$, wherein $R^1$ is a $C_1$ to $C_{20}$ hydrocarbyl group, X is a halogen, and $1 \le m \le 4$, such as titanium tetrachloride, titanium tetrabromide, titanium tetraiodate, tetrabutoxy titanium, tetraethoxy titanium, chlorotriethoxy titanium, dichlorodiethoxy titanium, and trichloroethoxy titanium, preferably titanium tetrachloride.

Solid component a) of the present disclosure can be prepared by the methods listed below.

Method One: the method as disclosed in CN1506384 is used for preparing the catalyst component. To start with, a magnesium compound and an organic alcohol compound at a molar ratio of 2:1 to 5:1 are mixed with an inert solvent. The resulting mixture is heated up to 120° C. to 150° C., and after the addition of an anhydride at a molar ratio of magnesium to anhydride in the range from 5:1 to 10:1, reaction is carried out for 1 hour to 5 hours. Afterwards, an alcoholate cooled down to room temperature is added into a titanium compound solution pre-cooled to −15° C. to 50° C. with the molar ratio of titanium to magnesium in the range from 20:1 to 50:1. The temperature is then raised to 90° C. to 110° C., followed by addition of an internal electron donor as described above at a temperature in the range from 100° C. to 130° C. with the molar ratio of magnesium to the internal electron donor in the range from 2:1 to 10:1 for 1 reaction which takes 1 hour to 3 hours. Solid particles are then separated by filtration and added into a titanium compound solution with the molar ratio of titanium to magnesium in the range from 20:1 to 50:1. The resulting mixture is stirred at a temperature in the range from 100° C. to 130° C. for 1.5 hours to 3 hours of reaction. Solid particles are separated by filtration, washed with an inert solvent at a temperature in the range from 50° C. to 80° C., and dried to obtain the catalyst component.

Method Two: a magnesium compound is first dissolved into a solvent system containing an organic epoxy compound, an organic phosphorus compound, and an inert diluent to form a homogeneous solution, which is then mixed with a titanium compound. A solid is precipitated in the presence of a co-precipitating agent and treated with an internal electron donor as described above to load the internal electron donor on the solid. The solid can be further treated with a titanium tetrahalide and inert diluent where necessary.

The magnesium compound, titanium compound, and internal electron donor used in Method One and Method Two are as those described in the present disclosure. The organic epoxy compound, organic phosphorus compound, co-precipitating agent, etc. are disclosed in CN8510997, and relevant contents thereof are incorporated herein for reference. For example, the organic epoxy compound can be selected from the group consisting of oxides of aliphatic olefins, dienes, and halogenated aliphatic olefins and dienes, glycidyl ethers, and inner ethers with the number of carbon atoms all in the range from 2 to 8. Specific compounds thereof can, for example, be ethylene oxide, propene oxide, butylene oxide, butadiene oxide, butadiene dioxide, epichlorohydrin, methyl glycidyl ether, diglycidyl ether, and tetrahydrofuran. The organic phosphorus compound can, for example, comprise hydrocarbyl esters or halogenated hydrocarbyl esters of orthophosphoric acid or phosphorus acid, specifically including trimethyl orthophosphate, triethyl orthophosphate, tributyl orthophosphate, triphenyl orthophosphate, trimethyl phosphite, triethyl phosphite, tributyl phosphite, tribenzyl phosphite, etc. The co-precipitating agent can, for example, be selected from the group consisting of organic acid anhydrides, organic acids, ethers, ketones, and esters, specifically including acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, methyl ether, ethyl ether, propyl ether, butyl ether, amyl ether, succinate, malonate, glutarate, 2,4-pentanediol ester, 3,5-heptanediol ester, etc. Based on per mol of the magnesium compound, the dosages of the organic epoxy compound, the organic phosphorus compound, the co-precipitating agent, the titanium compound, and the internal electron donor are in the ranges from 0.2 mol to 10 mol, 0.1 mol to 3 mol, 0 mol to 1.0 mol, 0.5 mol to 150 mol, and 0.01 mol to 1.0 mol, respectively.

Method Three: the titanium compound of the present disclosure, specifically as $TiCl_4$, is reacted with an adduct having a general formula of $MgCl_2 \cdot pROH$ to prepare a solid catalyst component. In $MgCl_2 \cdot pROH$, p is in the range from 0.1 to 6, preferably from 2 to 3.5, and R represents a hydrocarbyl group having 1 to 18 carbon atoms. The adduct can be suitably prepared into a spherical one by the following method. In the presence of an inert hydrocarbon immiscible with the adduct, an alcohol (ROH) is mixed with $MgCl_2$ to form an emulsion, which is quenched. As such, the adduct can be solidified in the form of spherical particles. The adduct thus obtained can be directly reacted with the titanium compound, or can first go through dealcoholization (at a temperature in the range from 80° C. to 130° C.) under heat control to obtain another adduct before been reacted with the titanium compound, wherein the molar number of the alcohol is commonly smaller than 3, preferably in the range from 0.1 to 2.7. The reaction between the adduct (dealcoholized or the adduct per se) and the titanium compound can be performed by suspending the adduct in cold $TiCl_4$ (generally 0° C.), and heating up the resulting mixture to a temperature in the range from 80° C. to 130° C. through a temperature program. This temperature is then kept for 0.1 hour to 2 hours. The treatment with $TiCl_4$ can be performed once or a plurality of times, during which an internal electron donor of the present disclosure as described above can be added for treatment for once or a plurality of times.

Specifically, the method as disclosed in CN1091748 can be used to prepare the catalyst component. The melt of a magnesium chloride alcoholate is dispersed into a dispersing agent system of white oil and silicone oil via velocity mixing to form an emulsion, which is discharged into a liquid coolant for rapid cooling and stereotyping. As a result, microspheres of the magnesium chloride alcoholate are formed. The liquid coolant is an inert hydrocarbyl solvent having a low boiling point, such as petroleum ether, pentane, hexane, heptane, etc. The obtained magnesium chloride alcoholate spheres are washed and dried to be spherical carriers, wherein the molar ratio of alcohol to magnesium is in the range from 2:1 to 3:1, preferably 2:1 to 2.5:1, and the grain size of the spherical carrier is in the range from 10 μm to 300 μm, preferably 30 μm to 150 μm.

Excessive titanium tetrachloride is used for treating the above spherical carrier at a low temperature. While the temperature is gradually increased, the internal electron donor of the present disclosure is added. Pulverized spherical catalyst component can be obtained after a plurality of times of washing by an inert solvent and a drying step. The molar ratio of titanium tetrachloride to magnesium chloride is in the range from 20:1 to 200:1, preferably from 30:1 to 60:1; the initial treatment temperature is in the range from −30° C. to 0° C., preferably from −25° C. to −20° C.; and the final treatment temperature is in the range from 80° C. to 136° C., preferably from 100° C. to 130° C.

Method Four: a dialkoxy magnesium compound can be added into an aromatic hydrocarbon under stirring to form a suspension, which is treated with titanium tetrachloride at a temperature in the range from −20° C. to 100° C. Reaction occurs at a temperature in the range from 0° C. to 130° C. In this process, the internal electron donor of the present disclosure is added for reaction. The resulting solid thereof is washed with an aromatic hydrocarbon compound, added into an aromatic solvent at a temperature in the range from 0° C. to 130° C., treated with titanium tetrachloride, washed with an inert solvent, and then pump dried to obtain a solid catalyst component. Based on per mol of the dialkoxy magnesium compound, the dosages of the titanium tetrachloride and the electron donor are in the ranges from 0.5 mol to 100 mol and 0.01 mol to 10 mol, respectively.

Method Five: a dihydrocarbyloxy magnesium compound such as a dialkoxy magnesium or diaryloxy magnesium compound is halogenated by $TiCl_4$ or an aromatic hydrocarbon solution thereof at a temperature in the range from 80° C. to 130° C., the process of which can be repeated for once or a plurality of times with addition of the internal electron donor of the present disclosure.

Method Six: a catalyst component is prepared by the method as disclosed in U.S. Pat. No. 4,540,679. A hydrocarbyl magnesium carbonate carrier is first prepared through reaction between an alcohol magnesium compound and carbon dioxide, followed by reaction between and among a transition metal compound (preferably a tetravalent titanium compound), the hydrocarbyl magnesium carbonate carrier, and the internal electron donor of the present disclosure at a certain ratio in an inert solvent, wherein the molar ratio of the transition metal compound to the magnesium element is at least 0.5:1, and the dosage of the internal electron donor of the present disclosure is at most 1.0 mol based on per gram of titanium atoms. The inert solvent should go through purification to remove water, oxygen, carbon dioxide, and other substances that can easily poison the catalyst. The above reactions occur at temperatures in the range from −10° C. to 170° C. and last from several minutes to several hours.

Other methods for preparing solid catalyst component (A) include adding a magnesium compound, an electron donor, etc. into a diluent to form an emulsion, which is to be solidified to obtain a spherical solid by addition of a titanium compound. The spherical solid is further treated to obtain said solid catalyst component.

In any one of the above preparation methods, the electron donor can be added either in the form of a compound or in other forms, such as a suitable precursor of the electron donor that can be transformed into the electron donor via a known chemical reaction such as an esterification reaction.

In the catalyst composition of the present disclosure, the aluminum alkyl compounds (component b)) preferably have a general formula of $AlR'_nX_{3-n}$, wherein R' is selected from a $C_1$ to $C_{20}$ hydrocarbyl group, X is a halogen, and $1 \leq n \leq 3$. Specific examples of the aluminum alkyl compounds include triethylaluminum, tripropylaluminum, tri-n-butylaluminum, tri-iso-butylaluminum, tri-n-octylaluminum, tri-iso-butylaluminum, diethylaluminum hydride, diisobutylaluminum hydride, diethylaluminum chloride, diisobutylaluminum chloride, ethylaluminum sesquichloride, and ethylaluminum dichloride, preferably triethylaluminum and tri-iso-butylaluminum.

In the above catalyst composition, the aluminum alkyl compound can be used at a conventional dosage in the art. According to one preferred embodiment of the present disclosure, the molar ratio of component a) to component b) based on the molar ratio of titanium to aluminum is 1:(5-1000), preferably 1:(20-250).

In the catalyst composition of the present disclosure, the first external electron donor C1 is preferably a malonate compound as shown in Formula (I):

Formula (I)

wherein $R_9$ is a substituted or non-substituted $C_1$ to $C_{20}$ hydrocarbyl group, preferably a $C_1$ to $C_{10}$ hydrocarbyl group, and $R_7$ and $R_8$, identical with or different from each other, can be selected from the group consisting of hydrogen, halogens, and substituted or non-substituted $C_1$ to $C_{20}$ hydrocarbyl groups, preferably from the group consisting of hydrogen, halogens, and substituted or non-substituted $C_1$ to $C_{10}$ hydrocarbyl groups.

In one specific embodiment, $R_9$ is selected from the group consisting of substituted or non-substituted $C_1$ to $C_{10}$ straight-chain alkyl groups, $C_3$ to $C_{10}$ branched-chain alkyl groups, $C_3$ to $C_{10}$ cycloalkyl groups, $C_6$ to $C_{10}$ aryl groups, $C_7$ to $C_{10}$ alkaryl groups, and $C_7$ to $C_{10}$ aralkyl groups, preferably from the group consisting of substituted or non-substituted $C_2$ to $C_8$ straight-chain alkyl groups, $C_3$ to $C_8$ branched-chain alkyl groups, $C_3$ to $C_{10}$ cycloalkyl groups, and $C_7$ to $C_{10}$ alkaryl groups; and $R_7$ and $R_8$, identical with or different from each other, are selected from the group consisting of hydrogen, halogens, and substituted or non-substituted $C_1$ to $C_{10}$ alkyl groups, $C_1$ to $C_{10}$ alkylene groups, $C_3$ to $C_{10}$ cycloalkyl groups, $C_6$ to $C_{10}$ aryl groups, and $C_7$ to $C_{10}$ alkaryl or aralkyl groups, preferably from the group consisting of hydrogen, halogens, and substituted or non-substituted $C_1$ to $C_8$ alkyl groups, $C_2$ to $C_8$ alkylene groups, $C_3$ to $C_{10}$ cycloalkyl groups, $C_6$ to $C_{10}$ aryl groups, and $C_7$ to $C_{10}$ alkaryl groups. In one specific embodiment, $R_7$ and $R_8$ are not simultaneously hydrogen.

In one specific embodiment of the present disclosure, specific examples of the malonate compound can be at least one selected from but not limited to the group consisting of diethyl malonate, di-n-propyl malonate, diisopropyl malonate, di-n-butyl malonate, diisobutyl malonate, diethyl methylmalonate, di-n-propyl methylmalonate, di-iso-propyl methylmalonate, di-n-butyl methylmalonate, di-iso-butyl methylmalonate, di-tert-butyl methylmalonate, diethyl ethylmalonate, di-n-propyl ethylmalonate, di-iso-propyl ethylmalonate, di-n-butyl ethylmalonate, di-iso-butyl ethylmalonate, di-tert-butyl ethylmalonate, diethyl n-propylmalonate, di-n-propyl n-propylmalonate, di-iso-propyl n-propylmalonate, di-n-butyl n-propylmalonate, di-iso-butyl n-propylmalonate, di-tert-butyl n-propylmalonate, diethyl isopropylmalonate, di-n-propyl isopropylmalonate, di-iso-propyl isopropylmalonate, di-n-butyl isopropylmalonate, di-iso-butyl isopropylmalonate, di-tert-butyl isopropylmalonate, diethyl phenylmalonate, di-n-propyl phenylmalonate, di-iso-propyl phenylmalonate, di-n-butyl phenylmalonate, di-iso-butyl phenylmalonate, di-tert-butyl phenylmalonate, diethyl benzylmalonate, di-n-propyl benzylmalonate, di-iso-propyl benzylmalonate, di-n-butyl benzylmalonate, di-iso-butyl benzylmalonate, di-tert-butyl benzylmalonate, diethyl dimethylmalonate, diethyl diethylmalonate, diethyl methylethylmalonate, diethyl methyl-n-butylmalonate, diethyl methylisobutylmalonate, diethyl methyl-n-propylmalonate, diethyl methylisopropylmalonate, diethyl di-n-propyl-malonate, diethyl di-n-butyl-malonate, diethyl di-iso-propyl-malonate, diethyl di-iso-butyl-malonate, and diethyl di-allyl-malonate.

According to another specific embodiment of the present disclosure, the external electron donor can further comprise a second electron donor C2, preferably selected from the group consisting of silane, diether, and amine compounds. When a composite external electron donor system is used for olefin polymerization, especially in propene polymerization, it takes on obvious synergistic effect and improves hydrogen response of the catalyst and isotacticity of polymers, and expands molecular weight distribution of the polymers, while retaining high catalytic activity of the catalyst. Furthermore, the composite external electron donor enables the catalyst with better property of high-temperature self-extinguishment, which refers to decrease of catalytic activity at a temperature higher than 100° C. Regarding evaluation of activity at a high temperature, normalized activity ratio can be considered for comparison. Normalized activity ratio can be defined as $A_T/A_{67}$, wherein $A_T$ represents activity at the temperature of T and $A_{67}$ represents activity at 67° C. Currently, catalyst systems of which $A_T/A_{67}$ is 35% or lower at 100° C. are thought to have self-extinguishment.

In the catalyst composition, the second external electron donor C2 can be one which is commonly used in the prior art. The amine compounds can comprise a ring structure, such as piperidine, 2,6-substituted piperidine, and 2,5-substituted piperidine.

In one specific embodiment, the silane compounds have a general formula of $R^{41}{}_mR^{42}{}_nSi(OR^{43})_{4-m-n}$, wherein $R^{41}$ and $R^{42}$, identical with or different from each other, can be independently selected from the group consisting of halogens, hydrogen, $C_1$ to $C_{20}$ alkyl groups, $C_3$ to $C_{20}$ cycloalkyl groups, $C_6$ to $C_{20}$ aryl groups, and $C_1$ to $C_{20}$ halogenated alkyl groups; $R^{43}$ is selected from the group consisting of $C_1$ to $C_{20}$ alkyl groups, $C_3$ to $C_{20}$ cycloalkyl groups, $C_6$ to $C_{20}$ aryl groups, and $C_1$ to $C_{20}$ halogenated alkyl groups; and m" and n" are integers in the range from 0 to 3, respectively, and m"+n"<4. Preferably, the silane compounds can be at least one selected from the group consisting of trimethylmethoxysilane, diisopropyldimethoxysilane, diisobutyldimethoxysilane, isopropylisobutyldimethoxysilane, ditertbutyldimethoxysilane, tert-butylmethyldimethoxysilane, tert-butylethyldimethoxysilane, tert-butylpropyldimethoxysilane, tert-butylisopropyldimethoxysilane, cyclohexylmethyldimethoxysilane, dicyclohexyldimethoxysilane, cyclohexyl-tert-butyldimethoxysilane, cyclopentylmethyldimethoxysilane, cyclopentylethyldimethoxysilane, dicyclopentyldimethoxysilane, cyclopentylcyclohexyldimethoxysilane, bis(2-methyl-cyclopentyl)dimethoxysilane, diphenyldimethoxysilane, diphenyldiethoxysilane, phenyltriethoxysilane, methyltrimethoxysilane, methyltriethoxysilane, ethyltrimethoxysilane, propyltrimethoxysilane, propyltriethoxysilane, isopropyltrimethoxysilane, isopropyltriethoxysilane, butyltrimethoxysilane, butyltriethoxysilane, isobutyltrimethoxysilane, isobutyltriethoxysilane, pentyltrimethoxysilane, isopentyltrimethoxysilane, cyclopentyltrimethoxysilane, cyclohexyltrimethoxysilane, diphenyldimethoxysilane, diphenyldiethoxysilane, phenyltrimethoxysilane, phenyltriethoxysilane, vinyltrimethoxysilane, vinyltriethoxysilane, tetramethoxysilane, tetraethoxysilane, and tetrabutoxysilane. The organic silane compounds as aforementioned can be used separately, or in combinations of two or more kinds.

In another specific embodiment, the diether compounds have a general formula as shown in Formula (IV):

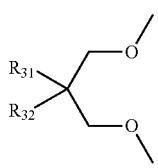

Formula (IV)

wherein $R_{31}$ and $R_{32}$, identical with or different from each another, are selected from the group consisting of substituted or non-substituted $C_1$ to $C_{10}$ straight-chain alkyl groups, $C_3$ to $C_{15}$ branched-chain alkyl groups, $C_3$ to $C_{15}$ cycloalkyl groups, $C_6$ to $C_{20}$ aryl groups, $C_7$ to $C_{20}$ alkaryl groups, and $C_7$ to $C_{20}$ aralkyl groups, preferably from the group consisting of substituted or non-substituted $C_1$ to $C_8$ straight-chain alkyl groups, $C_3$ to $C_{10}$ branched-chain alkyl groups, $C_3$ to $C_{10}$ cycloalkyl groups, $C_6$ to $C_{15}$ aryl groups, $C_7$ to $C_{15}$ alkaryl groups, and $C_7$ to $C_{15}$ aralkyl groups, $R_{31}$ and $R_{32}$ optionally being bounded to or not to form a ring. Diether compounds as external electron donors and electron donors can be either the same with or different from one another. Examples of specific dither compounds are as listed above.

In one preferred embodiment, the second external electron donor can be at least one selected from the group consisting of cyclohexylmethyldimethoxysilane, diphenyldimethoxysilane, phenyltriethoxysilane, diisopropyldimethoxysilane, dipropyldimethoxysilane, dicyclopentyldimethoxysilane, diphenyldimethylsilane, tetraalkoxysilane, butyltrimethoxysilane, 2-isopropyl-2-isopentyl-1,3-dimethoxypropane, 9,9-bis(methoxymethyl)fluorene, 2,2-dibutyl-1,3-dimethoxypropane, 2,2-diisobutyl-1,3-dimethoxypropane, and 2-isobutyl-2-isopentyl-1,3-dimethoxypropane.

According to one specific embodiment of the catalyst composition of the present disclosure, the molar ratio of the first external electron donor to the second external electron donor is (1-100):(100-1), preferably (1-50):(50-1), and more preferably (1-20):(20-1).

In the above catalyst composition, a conventional dosage of the external electron donor can be used. According to one preferred embodiment of the present disclosure, the molar ratio of component a) to component c) based on the molar ratio of titanium to the external electron donor is 1:(0.1-100), preferably 1:(1-50).

According to another aspect of the present disclosure, it provides a pre-polymerization catalyst system for olefin polymerization, comprising a pre-polymer obtained by pre-polymerizing an olefin in the presence of the catalyst composition according to the first aspect of the present disclosure, wherein the pre-polymerization multiple is 0.1 to 1000 g of olefin polymer per g of solid catalyst component a).

In the present disclosure, the "pre-polymerization catalyst" refers to a catalyst that has gone through polymerization at a low conversion. According to the present disclosure, an α-olefin the same as that used in polymerization can be used for pre-polymerization, wherein the α-olefin is preferably selected as propene. Specifically, propene or a mixture of propene and one or more α-olefins at most accounting for 20 mol % of the mixture is particularly preferred for the pre-polymerization. Preferably, the conversion of the solid catalyst component in the pre-polymerization is about 0.2 g to 500 g of polymers per g of solid catalyst component a).

The pre-polymerization can be performed in the liquid or gas phase at a temperature in the range from −20° C. to 80° C., preferably from 0° C. to 50° C. The pre-polymerization can be performed online as a part of a continuous polymerization process or can be performed independently in intermittent operations. In order to prepare 0.5 to 20 grams of polymers per gram of the catalyst composition, intermittent pre-polymerization of the catalyst of the present disclosure and propene are particularly preferred, wherein the polymerization pressure can be in the range from 0.01 MPa to 10 MPa.

According to another aspect of the present disclosure, it provides a method of olefin polymerization, wherein the olefin is polymerized in the presence of the catalyst composition or the pre-polymerization catalyst system as described above.

The catalyst composition of the present disclosure can be directly added into a reactor for polymerization, or can be used to produce the pre-polymerization catalyst system via pre-polymerization with the olefin before being added into the reactor.

The olefin polymerization of the present disclosure can be performed by a commonly known method in the liquid or gas phase, or in a liquid gas combination phase. A conventional technique such as a slurry process and a gas phase fluidized bed can be employed. Preferably, the polymerization is performed at a temperature in the range from 0° C. to 150° C., more preferably from 60° C. to 90° C.

The olefins of the present disclosure have a general formula of $CH_2$=CHR, wherein R can be hydrogen or a $C_1$ to $C_{12}$ hydrocarbyl or aryl group, such as propene, 1-butene, 4-methyl-1-pentene, and 1-hexene, preferably propene. For example, homopolymerization of propene or copolymerization between propene and other olefins can be adopted.

According to the present disclosure, use of a catalyst composition comprising an external electron donor that contains a malonate compound in olefin polymerization, especially polymerization of propene, can obviously improve catalytic activity and hydrogen response of the catalyst, and expand molecular weight distribution of polymers, which is beneficial for development of different polymers.

Further, when an external electron donor formulated by a malonate compound and an existing external electron donor is used for olefin, especially propene polymerization, it presents an obvious synergistic effect, not only retaining high catalytic activity of the catalyst, but also increasing the stereospecificity of polymers and expanding molecular weight distribution of the polymers. Hence, the composite electron donor facilitates processing of polymers and is suitable for development of different grades of resins.

DETAILED DESCRIPTION OF THE EMBODIMENTS

In order to make the present disclosure more understandable, examples will be referred to in the following for explanation of the present disclosure. These examples are merely used to explain, rather than to limit the scope of the present disclosure. Specific experimental methods not indicated in the following examples are usually performed according to respective conventional experimental methods.

Test Methods:

1. Melt indexes (MI) of polymers are tested in accordance with test standard GB/T 3682-2000.

2. Molecular weight distributions (MWD) (MWD=Mw/Mn) of polymers are tested by the gel permeation chromatography method with PL-GPC220 in trichlorobenzene as a solvent at 150° C. (standard sample: polystyrene; flow rate: 1.0 mL/min; column: 3×Plgel 10 um M1×ED-B 300×7.5 nm).

3. Isotactic indexes of polymers are tested by the heptane extraction method (6 hours of heptane extraction is performed at a boiling state), wherein 2 g of a dry polymer sample is arranged in an extractor for 6 hours of heptane extraction at a boiling state, and the residue is dried to constant weight to obtain polymers. The weight (g) of the resulting polymers is divided by 2 to obtain the isotactic index thereof.

Examples 1 to 8 and Comparative Examples 1 to 2

Preparation of Solid Catalyst Component a)

In a reactor where air was sufficiently displaced by high purity nitrogen, 6.0 g of magnesium chloride, 119 mL of toluene, 5 mL of epichlorohydrin, and 15.6 mL of tributyl phosphate (TBP) were successively added. The resulting mixture was heated up to 50° C. under stirring and kept at this temperature for 2.5 hours, during which period the solid added was adequately dissolved. 1.7 g of phthalic anhydride was added and kept for 1 hour. The resulting solution was cooled down to below −25° C., followed by addition of 70 mL of $TiCl_4$ within one hour. The temperature was gradually raised to 80° C., during which a solid precipitated. 6 mmol of the internal electron donor as shown in Table 1 was added and the temperature was kept for one hour. After filtration, 80 mL of toluene was added for twice of washing to obtain a solid precipitate.

Subsequently, 60 mL of toluene and 40 mL of $TiCl_4$ were added and the temperature was raised up to 100° C. for 2 hours of treatment. The filtrate was removed, which preceded further addition of 60 mL of toluene and 40 mL of $TiCl_4$. The temperature was raised up to 100° C. for 2 hours of treatment, and filtrate was removed. 60 mL of toluene was added for three times of washing at a boiling state. After that, 60 mL of hexane was added for twice of washing at a boiling state, followed by addition of 60 mL of hexane for twice of washing at room temperature. Thus, solid catalyst component a) was obtained.

Experiment of Propene Polymerization

Solid catalyst component a) was used for propene polymerization in the following procedures. In a 5 L stainless steel reactor, after air was sufficiently displaced by gaseous propene, 2.5 mmol of $AlEt_3$ and 0.1 mmol of the external electron donor as shown in Table 1 were added, followed by addition of 8 mg to 10 mg of solid catalyst component a), 1.2 NL of hydrogen, and 2.3 L of liquid propene. The resulting mixture was heated up to 70° C. and kept at this temperature for 1 hour. Afterwards, the temperature was lowered and the pressure was released to obtain the PP powder material used in Examples 1 to 8 and Comparative Examples 1 to 2. The data are shown in Table 1.

In propene polymerization, when 7.2 NL rather than 1.2 NL of hydrogen was added, the polymerization data would read Table 2.

TABLE 1

Result of propene polymerization

| Example | Internal electron donor | External electron donor | Polymerization activity (kgPP/gcat) | Isotactic index % |
|---|---|---|---|---|
| Example 1 | 2,4-pentanediol dibenzonate | 1C | 56.0 | 98.3 |
| Example 2 | 3-methyl-2,4-pentanediol dibenzonate | 2C | 58.4 | 98.5 |
| Example 3 | 3,5-heptanediol di-p-methyl benzoate | 3C | 56.8 | 98.4 |
| Example 4 | 2,4-pentanediol di-p-tert-butyl benzoate | 4C | 62.3 | 98.7 |
| Example 5 | 3,5-heptanediol dibenzoate | 5C | 52.0 | 96.0 |
| Example 6 | 3,5-heptanediol dibenzoate | 6C | 53.1 | 97.9 |
| Comparative Example 1 | 3,5-heptanediol dibenzoate | CHMMS | 50.6 | 98.0 |
| Example 7 | 2,3-diisopropyl succinate | 5C | 39.5 | 95.0 |
| Example 8 | 2,3-diisopropyl succinate | 6C | 40.7 | 98.3 |
| Comparative Example 2 | 2,3-diisopropyl succinate | CHMMS | 39.8 | 98.1 |

In Table 1:
1C refers to diethyl malonate and cyclohexylmethyldimethoxysilane (CHMMS) in a molar ratio of 1:5;
2C refers to diethyl benzylmalonate and cyclohexylmethyldimethoxysilane in a molar ratio of 3:2;
3C refers to diethyl diethylmalonate and dicyclopentyldimethoxysilane (DCPDMS) in a molar ratio of 20:3;
4C refers to diethyl methylmalonate and dicyclopentyldimethoxysilane in a molar ratio of 4:1;
5C refers to diethyl malonate; and
6C refers to diethyl malonate and cyclohexylmethyldimethoxysilane in a molar ratio of 1:8.

TABLE 2

| | Melt index/(g/10 min) | |
|---|---|---|
| Catalyst | 1.2 NL of hydrogen | 7.2 NL of hydrogen |
| Example 1 | 1.9 | 28.6 |
| Example 2 | 2.7 | 32.9 |
| Example 5 | 3.0 | 47.7 |
| Example 6 | 2.9 | 47.0 |
| Comparative | 1.6 | 28.0 |

TABLE 2-continued

| Catalyst | Melt index/(g/10 min) | |
|---|---|---|
| | 1.2 NL of hydrogen | 7.2 NL of hydrogen |
| Example 1 | | |
| Example 7 | 1.8 | 35.6 |
| Example 8 | 1.6 | 35.0 |
| Comparative Example 2 | 1.0 | 19.0 |

Tables 1 and 2 indicate that compared with the prior art (e.g. Comparative Examples 1 and 2), the catalyst composition of the present disclosure containing a malonate compound (as shown in Formula I) in the external electron donor can significantly improve melt indexes of polymers when being used in olefin polymerization (e.g. Examples 1 to 8), especially propene polymerization in the presence of a high hydrogen concentration. It means that hydrogen response of the catalyst composition is significantly improved. Particularly, compared with the prior art, when a composite system formulated by a malonate compound (as shown in Formula I) and other external electron donors is used, the polymers obtained will keep high isotacticity and the catalyst composition a high catalytic activity, while the melt indexes of the polymers are improved (i.e., hydrogen response of the catalyst composition is improved).

Examples 9 to 13 and Comparative Example 3

Preparation of Solid Catalyst Component a)

Under protection of nitrogen, 4.8 g of anhydrous magnesium chloride, 19.5 g of isooctanol, and 19.5 g of decane as a solvent were added into a 500 mL reactor arranged with a stirrer. The resulting mixture was heated up to 130° C., followed by 1.5 hours of reaction until the magnesium chloride was completely dissolved. 1.1 g of phthalic anhydride was added and the temperature of 130° C. was further kept for 1 hour of reaction to obtain an alcoholate, which was cooled down to room temperature.

Under the protection of nitrogen, the above alcoholate was dropwise added into 120 mL of a TiCl$_4$ solution pre-cooled to −22° C. The temperature was slowly raised to 100° C., which preceded addition of 10 mmol of the phthalate compound as shown in Formula (III) in Table 3. The temperature was then raised to 110° C. and kept for 2 hours. After hot filtration, 120 mL of TiCl$_4$ was added and heated up to 110° C. for one hour of reaction. Filtration was performed, and solid particles obtained were washed with anhydrous hexane for four times. Solid catalyst component a) was obtained after being dried.

Experiment of Propene Polymerization

Solid catalyst component a) obtained above was used for propene polymerization in the following procedures. In a 5 L stainless steel reactor, after air was sufficiently displaced by gaseous propene, 2.5 mmol of AlEt$_3$ and 0.1 mmol of the external electron donor as shown in Table 3 were added, followed by addition of 8 mg to 10 mg of solid catalyst component a), 1.2 NL of hydrogen, and 2.3 L of liquid propene. The resulting mixture was heated up to 70° C. and kept at this temperature for one hour. Afterwards, the temperature was lowered and the pressure was released to obtain the PP powder material used in Examples 9 to 13 and Comparative Example 3. The data are shown in Table 3.

In propene polymerization, when 7.2 NL rather than 1.2 NL of hydrogen was added, the polymerization data would read Table 4.

TABLE 3

Result of propene polymerization

| Example | Internal electron donor (III) | External electron donor | Polymerization activity (kgPP/gcat) | Isotactic index % | WMD |
|---|---|---|---|---|---|
| Example 9 | di-n-butyl phthalate | 7C | 41.9 | 98.2 | 6.9 |
| Example 10 | di-iso-octyl phthalate | 8C | 42.7 | 98.4 | 7.1 |
| Example 11 | di-iso-butyl phthalate | 9C | 39.4 | 98.5 | 7.0 |
| Example 12 | di-iso-butyl phthalate | 10C | 43.6 | 94.9 | 7.2 |
| Example 13 | di-iso-butyl phthalate | 11C | 43.2 | 98.6 | 6.9 |
| Comparative Example 3 | di-iso-butyl phthalate | DCPDMS | 41.3 | 98.5 | 4.5 |

In Table 3:
7C refers to dicyclopentyldimethoxysilane and diethyl methylmalonate in a molar ratio of 1:5;
8C refers to cyclohexylmethyldimethoxysilane and diethyl malonate in a molar ratio of 1:2;
9C refers to 9,9-bis(methoxymethyl)fluorene and diethyl dipropylmalonate in a molar ratio of 6:1;
10C refers to diethyl di-n-butylmalonate; and
11C refers to dicyclopentyldimethoxysilane and diethyl di-n-butylmalonate in a molar ratio of 4:1.

Table 3 shows, compared with the comparative example, the catalyst composition of the present disclosure containing a malonate compound as shown in Formula (I) as an external electron donor can render the molecular weight distribution of polymers obtained wider while retaining high polymerization activity, which is rather beneficial for development of different grades of resins.

TABLE 4

| Catalyst | Melt index/(g/10 min) | |
|---|---|---|
| | 1.2 NL of hydrogen | 7.2 NL of hydrogen |
| Example 10 | 6.6 | 38.9 |
| Example 12 | 6.3 | 40.6 |
| Example 13 | 7.0 | 40.7 |
| Comparative Example 3 | 4.0 | 23.2 |

Table 4 teaches that, compared with the comparative example, the catalyst composition containing a malonate compound as shown in Formula (I) in the external electron donor can improve melt indexes of the polymers obtained and significantly increase hydrogen response of the catalyst composition.

Examples 14 to 18 and Comparative Example 4

Preparation of Solid Catalyst Component a)

In a 250 mL first reactor arranged with a reflux condenser, a mechanical stirrer, and a thermometer, after air was sufficiently displaced by nitrogen, 36.5 mL of anhydrous ethanol and 21.3 g of anhydrous magnesium chloride were added. The resulting mixture was heated under stirring until the anhydrous magnesium chloride was completely dissolved, which preceded addition of 75 mL of while oil and 75 mL of silicone oil. The temperature was retained for a certain time at 120° C. In a 500 mL second reactor arranged with a high-speed blender, 112.5 mL of while oil and the same volume of silicone oil were pre-added and pre-heated up to 120° C. The mixture in the first reactor was quickly pushed into the second reactor. The resulting mixture was kept at 120° C. and stirred for 3 min at a speed of 3,500 rmp, and then completely transferred into a third reactor that was pre-added with 1,600 mL of hexane and pre-cooled to −25° C. under stirring. The final temperature should not exceed 0° C. Suction filtration, washing with hexane, and vacuum drying were successively performed to obtain 41 g of spherical particles, i.e., an alcoholate of magnesium chloride. The particles were sieved and a 100 mesh to 400 mesh carrier was taken to be analyzed and tested. The carrier was proved to be comprised of $MgCl_2 \cdot 2.38C_2H_5OH$.

7 g of the above spherical carrier, i.e., $MgCl_2 \cdot 2.38C_2H_5OH$ was taken and slowly added into a reactor that contained 150 mL of $TiCl_4$ pre-cooled to −20° C. The temperature was gradually raised to 40° C., followed by addition of 5 mmol of a diether compound as shown in Formula (IV). The temperature continued to be raised to 130° C. and kept at this temperature for two hours, which preceded suction filtration. 120 mL of $TiCl_4$ was further added. Afterwards, the temperature was slowly raised to 130° C. and kept for 2 hours. 60 mL of hexane was used for a plurality of times of washing until there was no chloridion in the filtrate. The filter cake was vacuum dried to obtain the solid catalyst component.

Experiment of Propene Polymerization

Solid catalyst component a) obtained above was used for propene polymerization in the following procedures. In a 5 L stainless steel reactor, after air was sufficiently displaced by gaseous propene, 2.5 mmol of $AlEt_3$ and 0.1 mmol of the external electron donor as shown in Table 5 were added, followed by addition of 8 mg to 10 mg of solid catalyst component a), 1.2 NL of hydrogen, and 2.3 L of liquid propene. The resulting mixture was heated up to 70° C. and kept at this temperature for 1 hour. Afterwards, the temperature was lowered and the pressure was released to obtain the PP powder material used in Examples 14 to 18 and Comparative Example 4. The data are shown in Table 5.

High-Temperature Self-Extinguishment

Examples 26 to 28

Preparation of Solid Catalyst Component a)

In a reactor where air was sufficiently displaced with high-purity nitrogen, 6.0 g of magnesium chloride, 119 mL of toluene, 5 mL of epichlorohydrin, and 15.6 mL of tributyl phosphate (TBP) were successively added. The resulting mixture was heated to 50° C. under stirring and was kept at this temperature for 2.5 hours until the solid was dissolved adequately. 1.7 g of phthalic anhydride was added and the system was kept for one hour. The resulting solution was cooled down to below −25° C., and 70 mL of $TiCl_4$ was dropwise added within one hour. The temperature was then gradually raised to 80° C., during which a solid gradually precipitated. 6 mmol of the internal electron donor as shown in Table 6 was added, and the temperature was kept for one hour. After filtration, 80 mL of toluene was added for twice of washing to obtain a solid precipitate.

60 mL of toluene and 40 mL of $TiCl_4$ were added. The resulting mixture was heated up to 100° C. and treated for two hours. After removing the filtrate, 60 mL of toluene and 40 mL of $TiCl_4$ were further added. The resulting mixture was again heated up to 100° C. and treated for two hours. The filtrate was removed, and 60 mL of toluene was added for three times of washing at a boiling state, which preceded addition of 60 mL of hexane for twice of washing at a boiling state. After that, 60 mL of hexane was added for twice of washing at room temperature to obtain the solid catalyst component.

Experiment of Propene Polymerization

In a dry 500 mL 3-mouth flask, after air was sufficiently displaced respectively by nitrogen and gaseous propene, 200 mL of decane was added and heated up to the temperature as required in Table 6. A certain amount of $AlEt_3$ and the

TABLE 5

Result of propene polymerization

| Example | Internal electron donor | Composite external electron donor | Polymerization activity (kgPP/gcat) | Isotactic index % | WMD |
|---|---|---|---|---|---|
| Example 14 | 2,2-diisobutyl-1,3-dimethoxypropane | 12C | 50.1 | 98.5 | 6.8 |
| Example 15 | 9,9-bis(methoxymethyl)fluorene | 13C | 60.8 | 98.8 | 7.6 |
| Example 16 | 2-isopropyl-2-isopentyl-1,3-dimethoxypropane | 14C | 50.8 | 98.2 | 7.3 |
| Example 17 | 2-isopropyl-2-isopentyl-1,3-dimethoxypropane | 15C | 51.1 | 96.9 | 7.4 |
| Example 18 | 2-isopropyl-2-isopentyl-1,3-dimethoxypropane | 16C | 51.8 | 98.5 | 7.3 |
| Comparative Example 4 | 2-isopropyl-2-isopentyl-1,3-dimethoxypropane | CHMMS | 50.7 | 98.5 | 5.0 |

In Table 5:
12C refers to cyclohexylmethyldimethoxysilane and diethyl malonate in a molar ratio of 1:8;
13C refers to 2-isopropyl-2-isopentyl-1,3-dimethoxypropane and diethyl malonate in a molar ratio of 3:1;
14C refers to dicyclopentyldimethoxysilane and diethyl methylmalonate in a molar ratio of 1:2;
15C refers to diisopropyl malonate; and
16C refers to dicyclopentyldimethoxysilane and diisopropyl malonate in a molar ratio of 20:1.

It can be seen from Table 5, compared with the comparative example, the catalyst composition of the present disclosure which contains a malonate compound as shown in Formula (I) in the external electron donor can render the molecular weight distribution of the polymers wider while retaining high activity of the catalyst and high isotacticity of the polymers.

external electron donor as shown in Table 6 were added at a micro-positive pressure of the propene, so as to guarantee that Al/Si=20 (mol), and Al/Ti=100 (mol). Catalyst component a) as prepared above was added at this temperature for two hours of reaction, until the reaction was terminated with ethanol. The polymers were then washed with ethanol and vacuum dried. The data are shown in Table 6, in which, DEM, DIPM, and DEM-2Bu refer to diethyl malonate, diisopropyl malonate, and diethyl di-n-butylmalonate, respectively.

TABLE 6

| Example | Internal electron donor | External electron donor (molar ratio) | AC*$_{100}$ | AC$_{67}$ | AC*$_{100}$/AC$_{67}$ |
|---|---|---|---|---|---|
| Example 26 | 3,5-heptanediol dibenzoate | DEM | 120.7 | 607.4 | 0.20 |
| | | DEM/CHMMS = 0.5 | 153.2 | 600.0 | 0.25 |
| | | CHMMS | 187.4 | 589.0 | 0.32 |
| Example 27 | diisobutyl phthalate | DIPM | 64.3 | 350.6 | 0.18 |
| | | DIPM/CHMMS = 1.5 | 79.1 | 342.1 | 0.23 |
| | | CHMMS | 101.1 | 336.1 | 0.30 |
| Example 28 | 9,9-bis(methoxymethyl)fluorene | DEM-2Bu | 135.1 | 725.6 | 0.19 |
| | | DEM-2Bu/DCPDMS = 1 | 174.1 | 736.4 | 0.24 |
| | | DCPDMS | 232.4 | 749.7 | 0.31 |

Note:
AC*$_{100}$ refers to normalization at 100° C. That is, actual activity at 100° C. × 1.93 (solubility difference of propene) = normalization at 100° C.

Table 6 indicates that when the catalyst composition of the present disclosure that contains a malonate compound as shown in Formula (I) in the external electron donor is used in olefin polymerization at a high temperature (e.g. 100° C.), in particular propene polymerization, it presents lower activity, i.e., a better high-temperature self-extinguishment, than when mere silane was used, so that occurrence of implosion at high temperature polymerization can be better prevented.

It should be noted that the above examples are only used to explain, rather than to limit the present disclosure in any manner. Although the present disclosure has been discussed with reference to preferable examples, it should be understood that the terms and expressions adopted are for describing and explaining instead of limiting the present disclosure. The present disclosure can be modified within the scope of the claims, or can be amended without departing from the scope or spirits of the present disclosure. Although the present disclosure is described with specific methods, materials, and examples, the scope of the present disclosure herein disclosed should not be limited by the particularly disclosed examples as described above, but can be extended to other methods and uses having the same functions.

The invention claimed is:

1. A catalyst composition for olefin polymerization, comprising the following components:
   a): a solid catalyst component containing magnesium, titanium, halogens, and at least one internal electron donor having a lone pair of electrons;
   b): an aluminum alkyl compound; and
   c): an external electron donor containing a first external electron donor C1, which is a malonate compound and a second external electron donor C2 selected from the group consisting of silane, diether, and amine compounds,
   wherein the internal electron donor is selected from the group of compounds containing the atom of O, N, P, or S.

2. The catalyst composition of claim 1, wherein the malonate compound has a general formula as shown in Formula (I):

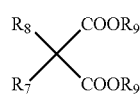

Formula (I)

wherein R$_9$ is a substituted or non-substituted C$_1$ to C$_{20}$ hydrocarbyl group, and R$_7$ and R$_8$, identical with or different from each other, are selected from the group consisting of hydrogen, halogens, and substituted or non-substituted C$_1$ to C$_{20}$ hydrocarbyl groups.

3. The catalyst composition according to claim 2, wherein R$_9$ is selected from the group consisting of substituted or non-substituted C$_1$ to C$_{10}$ straight-chain alkyl groups, C$_3$ to C$_{10}$ branched-chain alkyl groups, C$_3$ to C$_{10}$ cycloalkyl groups, C$_6$ to C$_{10}$ aryl groups, C$_7$ to C$_{10}$ alkaryl groups, and C$_7$ to C$_{10}$ aralkyl groups; and
   wherein, R$_7$ and R$_8$, identical with or different from each other, are selected from the group consisting of hydrogen, halogens, and substituted or non-substituted C$_1$ to C$_{10}$ alkyl groups, C$_1$ to C$_{10}$ alkylene groups, C$_3$ to C$_{10}$ cycloalkyl groups, C$_6$ to C$_{10}$ aryl groups, and C$_7$ to C$_{10}$ alkaryl or aralkyl groups.

4. The catalyst composition of claim 1, wherein the malonate compound is at least one selected from the group consisting of diethyl malonate, di-n-propyl malonate, diisopropyl malonate, di-n-butyl malonate, diisobutyl malonate, diethyl methylmalonate, di-n-propyl methylmalonate, di-iso-propyl methylmalonate, di-n-butyl methylmalonate, di-iso-butyl methylmalonate, di-tert-butyl methylmalonate, diethyl ethylmalonate, di-n-propyl ethylmalonate, di-iso-propyl ethylmalonate, di-n-butyl ethylmalonate, di-iso-butyl ethylmalonate, di-tert-butyl ethylmalonate, diethyl n-propylmalonate, di-n-propyl n-propylmalonate, di-iso-propyl n-propylmalonate, di-n-butyl n-propylmalonate, di-iso-butyl n-propylmalonate, di-tert-butyl n-propylmalonate, diethyl isopropylmalonate, di-n-propyl isopropylmalonate, di-iso-propyl isopropylmalonate, di-n-butyl isopropylmalonate, di-iso-butyl isopropylmalonate, di-tert-butyl isopropylmalonate, diethyl phenylmalonate, di-n-propyl phenylmalonate, di-iso-propyl phenylmalonate, di-n-butyl phenylmalonate, di-iso-butyl phenylmalonate, di-tert-butyl phenylmalonate, diethyl benzylmalonate, di-n-propyl benzylmalonate, di-iso-propyl benzylmalonate, di-n-butyl benzylmalonate, di-iso-butyl benzylmalonate, di-tert-butyl benzylmalonate, diethyl dimethylmalonate, diethyl diethylmalonate, diethyl methylethylmalonate, diethyl methyl-n-butylmalonate, diethyl methylisobutylmalonate, diethyl methyl-n-propylmalonate, diethyl methylisopropylmalonate, diethyl di-n-propyl-malonate, diethyl di-n-butyl-malonate, diethyl di-iso-propyl-malonate, diethyl di-iso-butyl-malonate, and diethyl di-allyl-malonate.

5. The catalyst composition of claim 1, wherein the internal electron donor in solid catalyst component a) is selected from the group consisting of ether, ester, phenolic ether, phenolic ester, and ketone compounds.

6. The catalyst composition of claim 5, wherein the internal electron donor in solid catalyst component a) is selected from the group consisting of diol ester compounds, succinate compounds, phthalate compounds, and diether compounds.

7. The catalyst composition of claim 6, wherein the diol ester compounds have a general formula as shown in Formula (II):

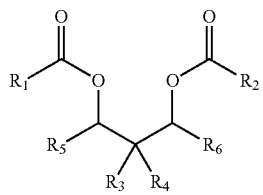

Formula (II)

wherein, $R_1$ and $R_2$, identical with or different from each other, are selected from the group consisting of substituted or non-substituted $C_1$ to $C_{20}$ alkyl groups, $C_3$ to $C_{20}$ cycloalkyl groups, $C_6$ to $C_{20}$ aryl groups, $C_7$ to $C_{20}$ alkaryl groups, and $C_7$ to $C_{20}$ aralkyl groups;

wherein, $R_3$ and $R_4$, identical with or different from each other, are selected from the group consisting of hydrogen, halogens, and substituted or non-substituted $C_1$ to $C_{10}$ straight-chain alkyl groups, $C_3$ to $C_{10}$ branched-chain alkyl groups, $C_3$ to $C_{10}$ cycloalkyl groups, $C_6$ to $C_{10}$ aryl groups, and $C_7$ to $C_{10}$ alkaryl or aralkyl groups; and wherein, $R_5$ and $R_6$, identical with or different from each other, are selected from the group consisting of halogens, and substituted or non-substituted $C_1$ to $C_{10}$ straight-chain alkyl groups, $C_3$ to $C_{10}$ branched-chain alkyl groups, $C_3$ to $C_{10}$ cycloalkyl groups, $C_6$ to $C_{10}$ aryl groups, and $C_7$ to $C_{10}$ alkaryl or aralkyl groups.

8. The catalyst composition of claim 6, wherein the diol ester compounds are at least one selected from the group consisting of 2,4-pentanediol dibenzoate, 2,4-pentanediol di-p-methyl-benzoate, 2,4-pentanediol di-m-methyl-benzoate, 2,4-pentanediol di-o-methyl-benzoate, 2,4-pentanediol di-p-ethyl-benzoate, 2,4-pentanediol di-p-n-propyl-benzoate, 2,4-pentanediol di-p-iso-propyl-benzoate, 2,4-pentanediol di-p-iso-butyl-benzoate, 2,4-pentanediol di-p-n-butyl-benzoate, 2,4-pentanediol di-p-tert-butyl-benzoate, 3-methyl-2,4-pentanediol dibenzoate, 3-ethyl-2,4-pentanediol dibenzoate, 3-n-propyl-2,4-pentanediol dibenzoate, 3-ethyl-2,4-pentanediol di-p-methyl-benzoate, 3-ethyl-2,4-pentanediol di-p-ethyl-benzoate, 3-ethyl-2,4-pentanediol di-p-n-propyl-benzoate, 3-ethyl-2,4-pentanediol di-p-iso-propyl-benzoate, 3-ethyl-2,4-pentanediol di-p-iso-butyl-benzoate, 3-ethyl-2,4-pentanediol di-p-n-butyl-benzoate, 3-ethyl-2,4-pentanediol di-p-tert-butyl-benzoate, 3-n-butyl-2,4-pentanediol dibenzoate, 3,3-di-methyl-2,4-pentanediol dibenzoate, 3-chloro-2,4-pentanediol dibenzoate, 3-bromo-2,4-pentanediol dibenzoate, 3,5-heptanediol dibenzoate, 3,5-heptanediol di-p-methyl-benzoate, 3,5-heptanediol di-p-ethyl-benzoate, 3,5-heptanediol di-p-n-propyl-benzoate, 3,5-heptanediol di-p-iso-propyl-benzoate, 3,5-heptanediol di-p-iso-butyl-benzoate, 3,5-heptanediol di-p-n-butyl-benzoate, 3,5-heptanediol di-p-tert-butyl-benzoate, 4-methyl-3,5-heptanediol dibenzoate, 4,4-dimethyl-3,5-heptanediol dibenzoate, 4-ethyl-3,5-heptanediol dibenzoate, 4-ethyl-3,5-heptanediol di-p-methyl-benzoate, 4-ethyl-3,5-heptanediol di-p-ethyl-benzoate, 4-ethyl-3,5-heptanediol di-p-propyl-benzoate, 4-ethyl-3,5-heptanediol di-p-butyl-benzoate, 4-ethyl-3,5-heptanediol di-p-tert-butyl-benzoate, 4-n-propyl-3,5-heptanediol dibenzoate, 4-n-butyl-3,5-heptanediol dibenzoate, 4-chloro-3,5-heptanediol dibenzoate, and 4-bromo-3,5-heptanediol dibenzoate.

9. The catalyst composition of claim 6, wherein the phthalate compounds have a general formula as shown in Formula (III):

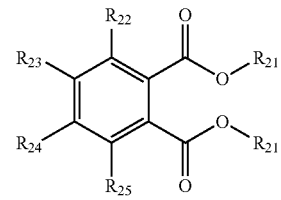

Formula (III)

wherein $R_{21}$ is selected from the group consisting of $C_1$ to $C_{10}$ straight-chain alkyl groups, $C_3$ to $C_{15}$ branched-chain alkyl groups, $C_3$ to $C_{15}$ cycloalkyl groups, $C_6$ to $C_{20}$ aryl groups, $C_7$ to $C_{20}$ alkaryl groups, and $C_7$ to $C_{20}$ aralkyl groups; and wherein $R_{22}$ to $R_{25}$, identical with or different from one another, are selected from the group consisting of hydrogen, halogens, and substituted or non-substituted $C_1$ to $C_{10}$ straight-chain alkyl groups, $C_3$ to $C_{15}$ branched-chain alkyl groups, $C_3$ to $C_{15}$ cycloalkyl groups, $C_6$ to $C_{20}$ aryl groups, $C_7$ to $C_{20}$ alkaryl groups, and $C_7$ to $C_{20}$ aralkyl groups.

10. The catalyst composition of claim 6, wherein the phthalate compounds are at least one selected from the group consisting of dimethyl phthalate, diethyl phthalate, di-n-propyl phthalate, di-iso-propyl phthalate, di-n-butyl phthalate, di-iso-butyl phthalate, di-n-pentyl phthalate, di-iso-pentyl phthalate, di-n-hexyl phthalate, di-iso-hexyl phthalate, di-n-octyl phthalate, di-iso-octyl phthalate, dibenzyl phthalate, dimethyl tetramethylphthalate, diethyl tetramethylphthalate, di-n-propyl tetramethylphthalate, di-iso-propyl tetramethylphthalate, di-n-butyl tetramethylphthalate, di-iso-butyl tetramethylphthalate, di-n-pentyl tetramethylphthalate, di-iso-pentyl tetramethylphthalate, di-n-hexyl tetramethylphthalate, di-iso-hexyl tetramethylphthalate, di-n-octyl tetramethylphthalate, di-iso-octyl tetramethylphthalate, dibenzyl tetramethylphthalate, dimethyl tetrabromophthalate, diethyl tetrabromophthalate, di-n-propyl tetrabromophthalate, di-iso-propyl tetrabromophthalate, di-n-butyl tetrabromophthalate, di-iso-butyl tetrabromophthalate, di-n-pentyl tetrabromophthalate, di-iso-pentyl tetrabromophthalate, di-n-hexyl tetrabromophthalate, di-iso-hexyl tetrabromophthalate, di-n-octyl tetrabromophthalate, di-iso-octyl tetrabromophthalate, and dibenzyl tetrabromophthalate.

11. The catalyst composition of claim 6, wherein the diether compounds have a general formula as shown in Formula (IV):

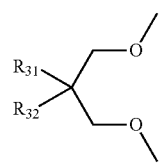

Formula (IV)

wherein R$_{31}$ and R$_{32}$, identical with or different from each another, are selected from the group consisting of substituted or non-substituted C$_1$ to C$_{10}$ straight-chain alkyl groups, C$_3$ to C$_{15}$ branched-chain alkyl groups, C$_3$ to C$_{15}$ cycloalkyl groups, C$_6$ to C$_{20}$ aryl groups, C$_7$ to C$_{20}$ alkaryl groups, and C$_7$ to C$_{20}$ aralkyl groups R$_{31}$ and R$_{32}$ optionally being bounded to or not to form a ring.

12. The catalyst composition of claim 6, wherein the diether compounds are at least one selected from the group consisting of
2,2-dimethyl-1,3-dimethoxypropane,
2,2-diethyl-1,3-dimethoxypropane,
2,2-dipropyl-1,3-dimethoxypropane,
2,2-diisopropyl-1,3-dimethoxypropane,
2,2-dibutyl-1,3-dimethoxypropane,
2,2-diisobutyl-1,3-dimethoxypropane,
2,2-dipentyl-1,3-dimethoxypropane,
2,2-di-isopentyl-1,3-dimethoxypropane,
2-methyl-2-ethyl-1,3-dimethoxypropane,
2-methyl-2-propyl-1,3-dimethoxypropane,
2-methyl-2-isopropyl-1,3-dimethoxypropane,
2-methyl-2-butyl-1,3-dimethoxypropane,
2-methyl-2-isobutyl-1,3-dimethoxypropane,
2-methyl-2-pentyl-1,3-dimethoxypropane,
2-methyl-2-isopentyl-1,3-dimethoxypropane,
2-ethyl-2-propyl-1,3-dimethoxypropane,
2-ethyl-2-isopropyl-1,3-dimethoxypropane,
2-ethyl-2-butyl-1,3-dimethoxypropane,
2-ethyl-2-isobutyl-1,3-dimethoxypropane,
2-ethyl-2-pentyl-1,3-dimethoxypropane,
2-ethyl-2-isopentyl-1,3-dimethoxypropane,
2-propyl-2-isopropyl-1,3-dimethoxypropane,
2-propyl-2-butyl-1,3-dimethoxypropane,
2-propyl-2-isobutyl-1,3-dimethoxypropane,
2-propyl-2-pentyl-1,3-dimethoxypropane,
2-propyl-2-isopentyl-1,3-dimethoxypropane,
2-isopropyl-2-isobutyl-1,3-dimethoxypropane,
2-isopropyl-2-pentyl-1,3-dimethoxypropane,
2-isopropyl-2-isopentyl-1,3-dimethoxypropane,
2-butyl-2-isobutyl-1,3-dimethoxypropane,
2-butyl-2-pentyl-1,3-dimethoxypropane,
2-butyl-2-isopentyl-1,3-dimethoxypropane,
2-isobutyl-2-pentyl-1,3-dimethoxypropane,
2-isobutyl-2-isopentyl-1,3-dimethoxypropane,
2-isobutyl-2-phenyl-1,3-dimethoxypropane,
2-isopentyl-2-phenyl-1,3-dimethoxypropane,
2-(2-methylbutyl)-2-benzyl-1,3-dimethoxypropane,
2-(2-ethylbutyl)-2-phenyl-1,3-dimethoxypropane,
2-(2-ethylhexyl)-2-phenyl-1,3-dimethoxypropane,
2-methyl-2-phenyl-1,3-dimethoxypropane,
2-ethyl-2-phenyl-1,3-dimethoxypropane,
2-isobutyl-2-benzyl-1,3-dimethoxypropane,
2-isopentyl-2-benzyl-1,3-dimethoxypropane,
2-(2-methylbutyl)-2-benzyl-1,3-dimethoxypropane,
2-(2-ethylbutyl)-2-benzyl-1,3-dimethoxypropane,
2-(2-ethylhexyl)-2-benzyl-1,3-dimethoxypropane,
2-propyl-2-benzyl-1,3-dimethoxypropane,
2-isopropyl-2-benzyl-1,3-dimethoxypropane,
2-isobutyl-2-(2-ethylbutyl)-1,3-dimethoxypropane,
2-isopentyl-2-(2-ethylbutyl)-1,3-dimethoxypropane,
2-(2-methylbutyl)-2-(2-ethylbutyl)-1,3-dimethoxypropane,
2-(2-ethylhexyl)-2-(2-ethylbutyl)-1,3-dimethoxypropane,
2-methyl-2-(2-ethylbutyl)-1,3-dimethoxypropane,
2-ethyl-2-(2-ethylbutyl)-1,3-dimethoxypropane,
2-isobutyl-2-(2-methylbutyl)-1,3-dimethoxypropane,
2-isopentyl-2-(2-methylbutyl)-1,3-dimethoxypropane,
2-(2-ethylbutyl)-2-(2-methylbutyl)-1,3-dimethoxypropane,
2-(2-ethylhexyl)-2-(2-methylbutyl)-1,3-dimethoxypropane,
2-isobutyl-2-(2-methylbutyl)-1,3-dimethoxypropane,
2-isobutyl-2-(2-ethylhexyl)-1,3-dimethoxypropane,
2-isopentyl-2-(2-ethylhexyl)-1,3-dimethoxypropane,
2,2-bis(2-methylbutyl)-1,3-dimethoxypropane,
2-isopropyl-2-isopentyl-1,3-dimethoxypropane,
2,2-bis(2-ethylhexyl)-1,3-dimethoxypropane, and
9,9-bis(methoxymethyl)fluorene.

13. The catalyst composition of claim 1, wherein the silane compounds have a general formula of R$^{41}_{m''}$R$^{42}_{n''}$Si(OR$^{43}$)$_{4-m''-n''}$, wherein, R$^{41}$ and R$^{42}$, identical with or different from each other, can be independently selected from the group consisting of halogens, hydrogen, C$_1$ to C$_{20}$ alkyl groups, C$_3$ to C$_{20}$ cycloalkyl groups, C$_6$ to C$_{20}$ aryl groups, and C$_1$ to C$_{20}$ halogenated alkyl groups,
wherein, R$^{43}$ is selected from the group consisting of C$_1$ to C$_{20}$ alkyl groups, C$_3$ to C$_{20}$ cycloalkyl groups, C$_6$ to C$_{20}$ aryl groups, and C$_1$ to C$_{20}$ halogenated alkyl groups, and
wherein m" and n" are integers in the range from 0 to 3, respectively, and m"+n"<4.

14. The catalyst composition of claim 1, wherein the diether compounds have a general formula as shown in Formula (IV):

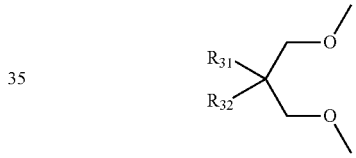

Formula (IV)

wherein R$_{31}$ and R$_{32}$, identical with or different from each another, are selected from the group consisting of substituted or non-substituted C$_1$ to C$_{10}$ straight-chain alkyl groups, C$_3$ to C$_{15}$ branched-chain alkyl groups, C$_3$ to C$_{15}$ cycloalkyl groups, C$_6$ to C$_{20}$ aryl groups, C$_7$ to C$_{20}$ alkaryl groups, and C$_7$ to C$_{20}$ aralkyl groups R$_{31}$ and R$_{32}$ optionally being bounded to or not to form a ring.

15. The catalyst composition of claim 1, wherein the second external electron donor C2 is at least one selected from the group consisting of cyclohexylmethyldimethoxysilane, diphenyldimethoxysilane, phenyltriethoxysilane, diisopropyldimethoxysilane, dipropyldimethoxysilane, dicyclopentyldimethoxysilane, diphenyldimethylsilane, tetraalkoxysilane, butyltrimethoxysilane, 2-isopropyl-2-isopentyl-1,3-dimethoxypropane, 9,9-bis(methoxymethyl)fluorene, 2,2-dibutyl-1,3-dimethoxypropane, 2,2-diisobutyl-1,3-dimethoxypropane, and 2-isobutyl-2-isopentyl-1,3-dimethoxypropane.

16. The catalyst composition of claim 1, wherein the molar ratio of the first external electron donor to the second external electron donor is (1-100):100-1).

17. The catalyst composition of claim 1, wherein the molar ratio of component a) to component b) based on the molar ratio of titanium to aluminum is 1:(5-1000).

18. A pre-polymerization catalyst system, comprising a pre-polymer obtained by pre-polymerizing an olefin in the presence of the catalyst composition of claim 1, wherein the pre-polymerization multiple is 0.1 to 1000 gram of olefin polymer per gram of solid catalyst component a).

19. A method of olefin polymerization, comprising polymerizing an olefin in the presence of the catalyst composition of claim 1 or the pre-polymerization catalyst system of claim 18, wherein the olefin has a general formula of $CH_2$=CHR, with R being hydrogen or a $C_1$ to $C_{12}$ hydrocarbyl or aryl group.

* * * * *